United States Patent [19]

Kitagawa et al.

[11] Patent Number: 5,433,139
[45] Date of Patent: Jul. 18, 1995

[54] BREAD MAKING MACHINE

[75] Inventors: Yuichi Kitagawa; Takashi Miyamoto, both of Daito, Japan

[73] Assignee: Funai Electric Co., Ltd., Osaka, Japan

[21] Appl. No.: 354,009

[22] Filed: Dec. 5, 1994

[30] Foreign Application Priority Data

Dec. 6, 1993 [JP] Japan ................... 5-339745
May 31, 1994 [JP] Japan ................... 6-139713

[51] Int. Cl.⁶ .............. A21D 8/00; A47J 27/00; G06F 15/20
[52] U.S. Cl. ...................... 99/327; 99/331; 99/344; 99/348; 364/400; 364/557; 366/98; 366/146; 366/314; 366/601
[58] Field of Search ................ 99/325–328, 99/331–333, 342, 344, 468, 486; 219/492, 494, 501; 364/140, 141, 400, 477, 550, 557; 366/98, 144–146, 314, 601; 426/231–233, 503, 504, 523

[56] References Cited

U.S. PATENT DOCUMENTS

| | | | |
|---|---|---|---|
| 4,538,509 | 9/1985 | Ojima et al. | 366/98 |
| 4,762,057 | 8/1988 | Hirota et al. | 99/348 |
| 4,776,265 | 10/1988 | Ojima | 99/348 |
| 4,903,587 | 2/1990 | Nagasaka et al. | 99/325 |
| 4,903,589 | 2/1990 | Aoyama et al. | 99/331 |
| 4,951,559 | 8/1990 | Arao et al. | 366/146 |
| 4,957,040 | 9/1990 | Nakakura et al. | 99/331 |
| 4,984,512 | 1/1991 | Takahashi et al. | 99/327 |
| 5,019,972 | 5/1991 | Rim | 364/400 |
| 5,076,153 | 12/1991 | Takahashi et al. | 99/327 |
| 5,351,606 | 10/1994 | Matsuzaki | 366/601 |

Primary Examiner—Timothy F. Simone
Attorney, Agent, or Firm—Bacon & Thomas

[57] ABSTRACT

A bread making machine that prepares a dough by mixing and kneading water and ingredients poured into a bread baking case, leavens the dough, and thereafter bakes the leavened dough. The bread making machine is provided with an outside air temperature detector and an outside air humidity detector, and a dough leavening condition corresponding to a predetermined bread rising degree is set based on the correlational data on outside air temperatures and outside air humidities in function of dough rising degree and the values detected by the outside air temperature and humidity detectors.

9 Claims, 8 Drawing Sheets

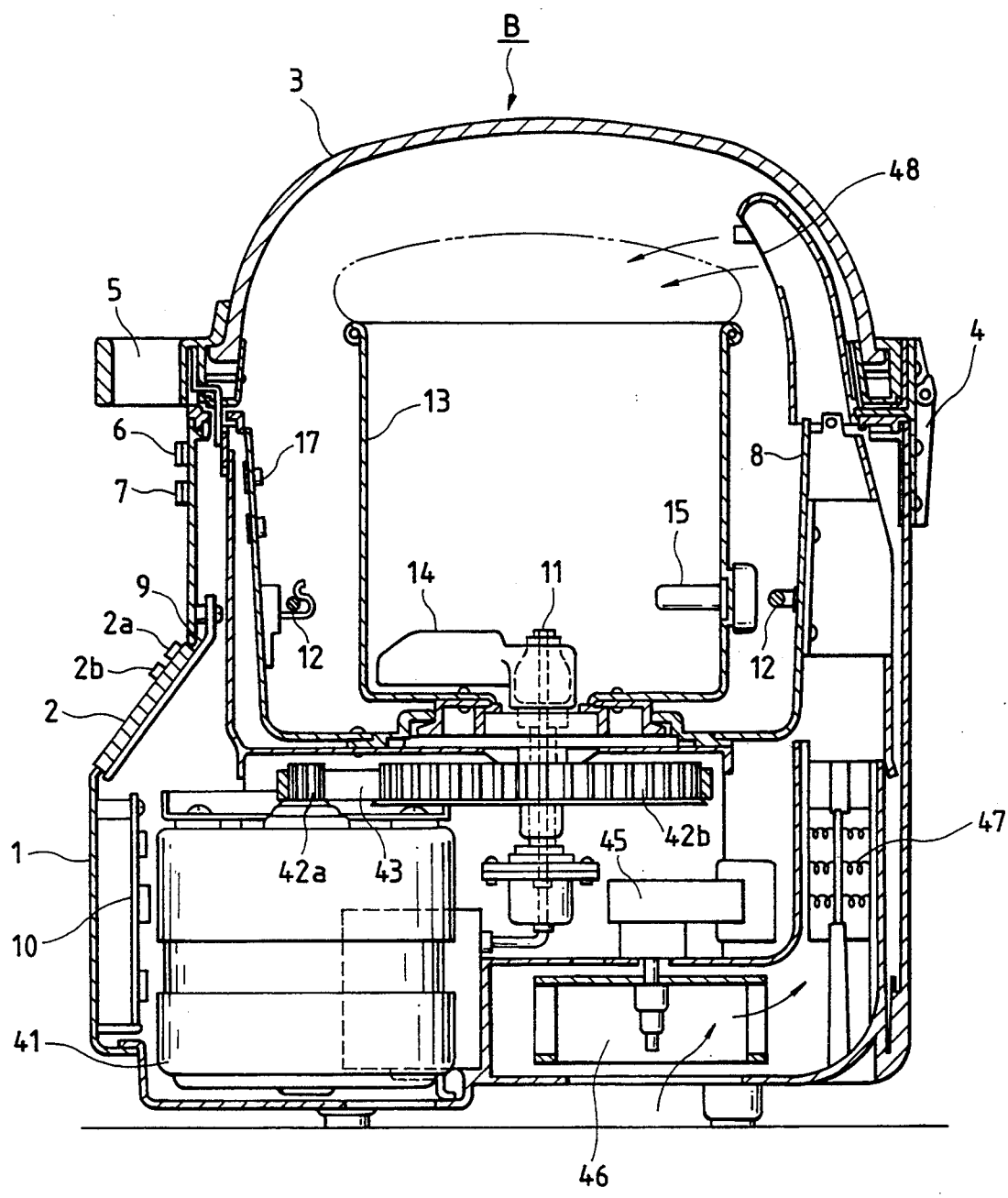

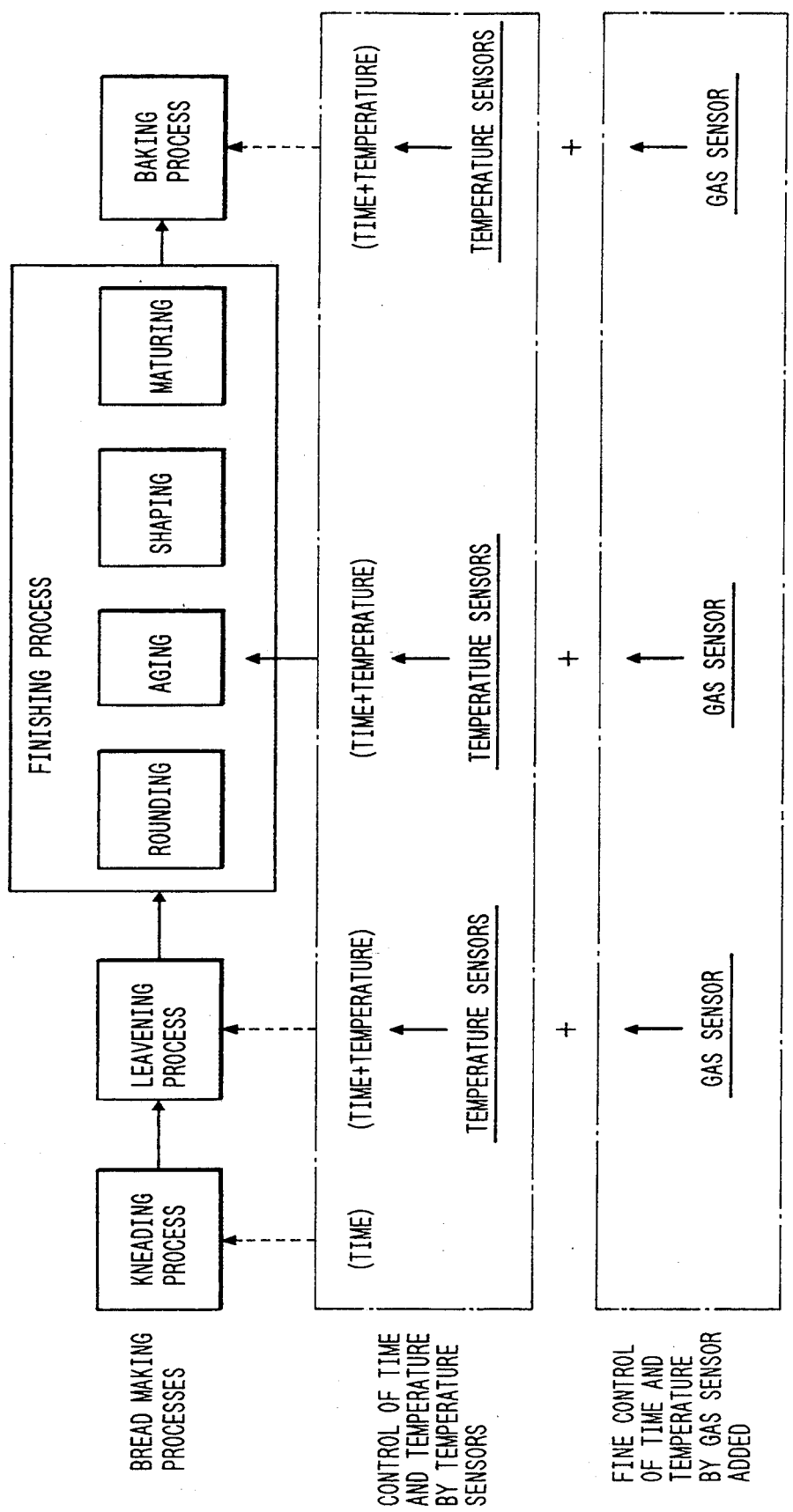

BREAD MAKING MACHINE

BACKGROUND OF THE INVENTION

1. Field of the Invention

The invention relates mainly to a bread making machine for domestic use and, more particularly, to a bread making machine that prepares a dough by mixing and kneading water and ingredients poured into a bread baking case, leavens the dough, and thereafter bakes the leavened dough.

2. Description of the Related Art

A conventional bread making machine used at home is generally designed to make bread by pouring water and ingredients such as flour and yeast into a bread baking case arranged in a closed container, preparing a dough while mixing and kneading the ingredients within the case, subjecting the dough to primary and secondary leavening processes, and thereafter baking the thus leavened dough. Such a bread making machine has a baking oven main body with an opening on top thereof, and a lid made of a piece of transparent glass is put on the opening to allow the bread making processes to be observed well. The baking oven main body accommodates a bread baking case therein.

Although the aforementioned bread making machine having the lid made of transparent glass is advantageous in observing the bread making processes inside the container, this bread making machine is disadvantageous in that the bread making conditions inside the baking oven main body are susceptible to effects of ambient temperature and humidity through the transparent glass because the glass lid is in direct contact with outside air.

As a result, under a particularly high ambient temperature and under a high humidity, the dough rising degree during the dough leavening process fluctuates to a large extent, making the size, especially, the height of baked breads inconsistent from one season to another. In addition, not only the size but also the finish of the baking are affected, making it likely to impose quality-related problems.

Further, a problem has been addressed in the dough preparing process as well. Since no instructions are given in the manual to adjust the amounts of water and flour in consideration of changes in temperature and humidity from one season to another, finished breads are too high or too short although all the breads are baked using the same amounts of water and flour. Thus, the user has been coerced to adjust the amounts of water and flour based on her sixth sense or experience, which is an uncertain, cumbersome part of the work that makes the bread making with the bread making machine extremely inconvenient.

Still further, the conventional bread making machine determines the start time, continuation time, and operating temperature of each of a leavening process, a finishing process, and a baking process based on measurements made by a dough temperature sensor and an oven temperature sensor. That is, the control of each process is effected based on the operation condition determined by the detected dough temperature and oven temperature. Such a conventional bread making machine cannot take good care of an ingredient when such ingredient has a kind of component that is different from what the bread making machine deems as standard, e.g., when flour has a different gluten content and yeast exhibits a different quality. In addition, the conventional bread making machine can accommodate the amounts of ingredients for one loaf or two loaves of bread, but not for less than one loaf or more than two loaves. Even if breads are made using the same amounts of ingredients under the same outside air temperature and in the same weather condition, the leavening process is, e.g., quickened, or the leavening is, e.g., insufficient. That is, the conventional bread making machine is not successful in properly accommodating differences in the quality and kind of an ingredient used.

SUMMARY OF THE INVENTION

An object of the invention is to provide a bread making machine capable of automatically setting a dough leavening condition in response to changes in outside air temperature and humidity caused by changes in season or the like.

To achieve the above object, the invention provides a bread making machine having a baking oven main body, a bread baking case set in the baking oven main body, and a lid attached to an opening on top of the baking oven main body so as to be allowed to freely open and close, and preparing a dough by pouring water and ingredients into the bread baking case, mixing and kneading the poured ingredients, leavening the dough, and thereafter baking the leavened dough, the bread making machine including: temperature detection means for detecting an outside air temperature; humidity detection means for detecting an outside air humidity; and optimum leavening control means, which has correlational data on outside air temperatures and outside air humidities in function of dough rising degree, for setting a dough leavening condition corresponding to a predetermined bread rising degree based on the correlational data and values detected by the temperature detection means and the humidity detection means.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

FIG. 4 is a sectional view of a bread making machine, which is a second embodiment of the invention;

FIG. 8 is a process diagram illustrative of a relationship between respective processes and operations of temperature sensors and a gas sensor.

DETAILED DESCRIPTION OF THE PREFERRED EMBODIMENTS

Embodiments of the invention will now be described with reference to the drawings.

Figure 1:
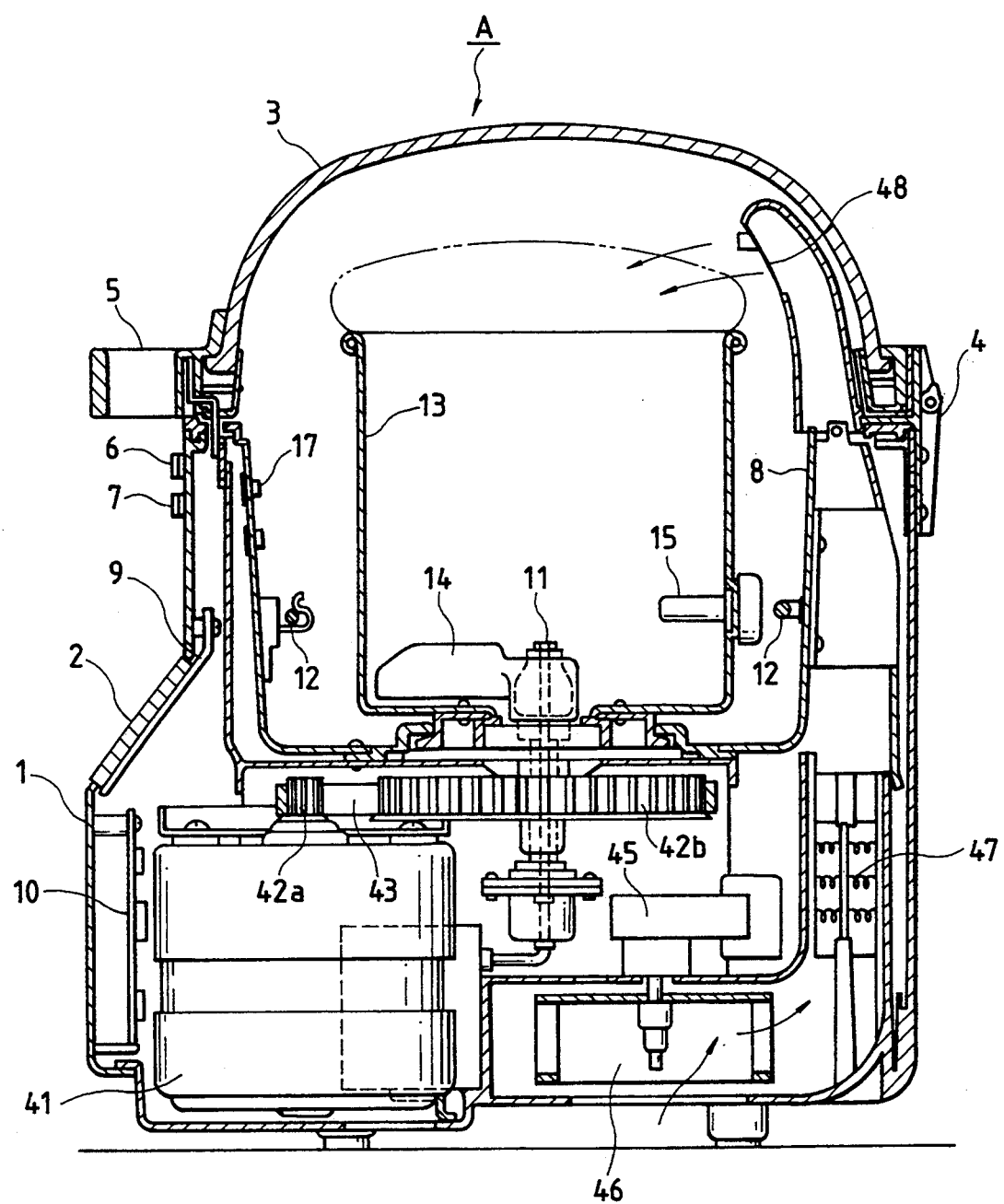
FIG. 1 is a sectional view of a bread making machine, which is a first embodiment of the invention.
Figure 2:
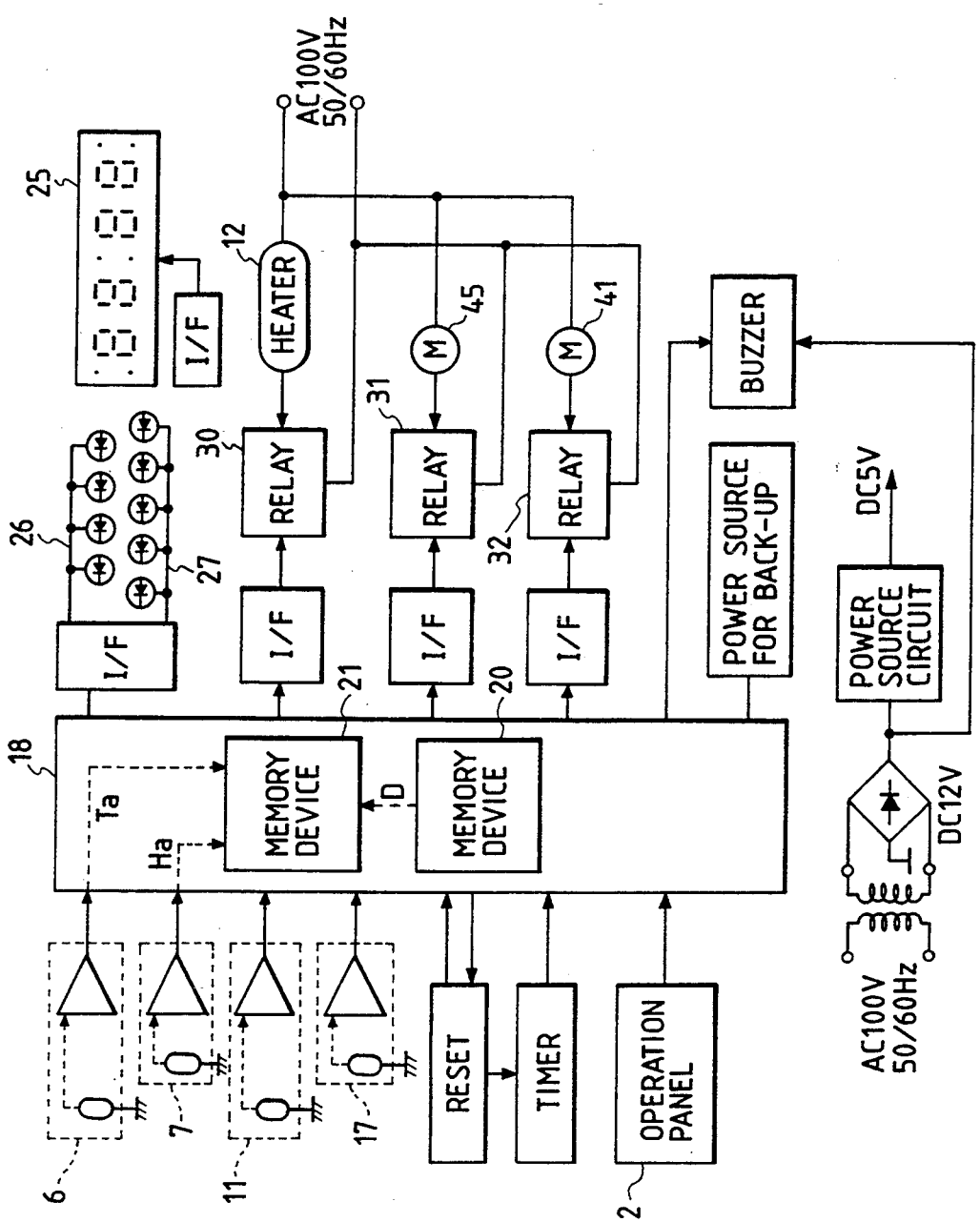
FIG. 2 is a block diagram showing the bread making machine of FIG. 1.

FIG. 1 is a sectional view of a bread making machine, which is a first embodiment of the invention; FIG. 2 is a block diagram showing the bread making machine of FIG. 1; and FIGS. 3 (a) and 3 (b) are diagrams illustrative of correlational data stored in memory within a microcomputer shown in FIG. 2.

In FIGS. 1 and 2, a bread making machine A, which is the first embodiment of the invention, has a cylindrical baking oven main body 1. An operation panel 2 having time setting and baking finish selection switches as well as input keys is provided in the middle of the front of the braking oven main body 1. A dome-like glass lid 3 is arranged on top of the baking oven main body 1 so that the lid can be opened and closed. The baking oven main body 1 and the glass lid 3 constitute the closed container type bread making machine A.

In this case, the glass lid 3 is formed of a piece of transparent glass so that the inside of the baking oven main body 1 can be seen through with the lid closed. The rear end of the glass lid 3 is pivotally attached to a bracket 4 arranged on the baking oven main body 1, whereas a handle 5 is disposed on the front end of the glass lid 3 so that the user can open and close the lid.

Inside the baking oven main body 1 are a cylindrical inner case 8, a display 25 corresponding to the operation panel 2, menu displaying LEDs 26, process displaying LEDs 27, and an operation board 9 with a key input drive section and the like attached thereto. A circuit board 10 supervising the control of the whole processes is also arranged.

A heat ray radiating heater 12, which is an electrothermic member, is annularly secured to the inner circumference of the inner case 8.

A bread baking case 13, which is cylindrical with the top thereof opened, is placed within the inner case 8. A stirring blade 14 for mixing and kneading ingredients including water poured into the bread baking case 13 is rotatably arranged on the bottom of the case. In addition, a projecting member 15 is secured to the inner surface of the bread baking case 13 so as to prevent the dough that has been made plastic by stirring from being moved with the stirring blade 14.

A dough sensor 11, which is a thermistor, is attached to the stirring blade 14 as a temperature detector. Further, an oven sensor 17 as a baking temperature detector is attached close to the bread baking case 13. On the outer circumference of the baking oven main body 1 are an outside air temperature detector 6 and an outside air humidity detector 7 so that the temperature and humidity of outside air can be detected. These sensors and detectors are provided to detect the temperature and humidity in a plurality of processes during bread making.

The plurality of processes during bread making will be described. First, predetermined ingredients are poured into the bread baking case 13, and the lid 3 is then closed. Upon turning on a switch on the operation panel 2, the heater 12 is activated to start a preheating process. Upon end of the preheating process, the stirring blade 14 is driven to stir the ingredients. Then, warm air is sent to the bread baking case 13 to start a kneading process to prepare a dough under the operation of the dough sensor 11. After completion of the kneading process, a leavening process for leavening the dough is started. When the leavening process is completed, a baking process is started under the operation of the oven sensor 17.

The circuit board 10 in FIG. 1 has a microcomputer 18 and the like. The microcomputer 18 controls the whole processes performed by the bread making machine A, and as shown in FIG. 2, includes a memory device 20 (such as ROM) for storing correlational data D, and a memory device 21 for storing an optimum leavening control program Pa.

The correlational data D are data indicating the effect of the temperature and humidity of outside air upon the dough rising degree. The correlational data have particular bearing on defining the leavening condition after the dough has been kneaded. A curve G1 in FIG. 3 (a) is a correlational curve indicating the relationship between the outside air temperature and the dough rising degree under a certain leavening condition (temperature and time). As is apparent from the curve, the dough rising degree is largely affected by the outside air temperature. The correlational data D include a plurality of correlational curves G1 under different leavening conditions (temperature and time).

Figure 3A:
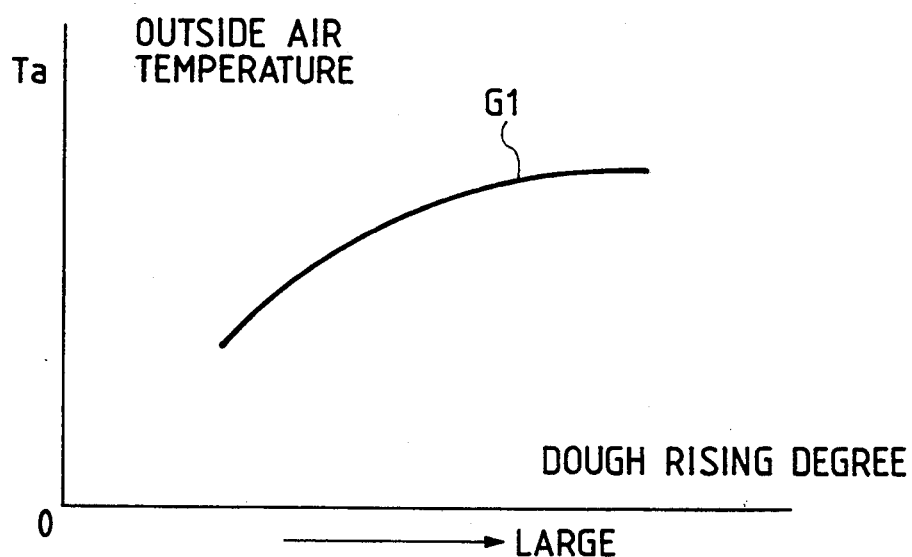
FIGS. 3 (a) and 3 (b) are diagrams illustrative of correlational data stored in memory within a microcomputer shown in FIG. 2.
Figure 3B:
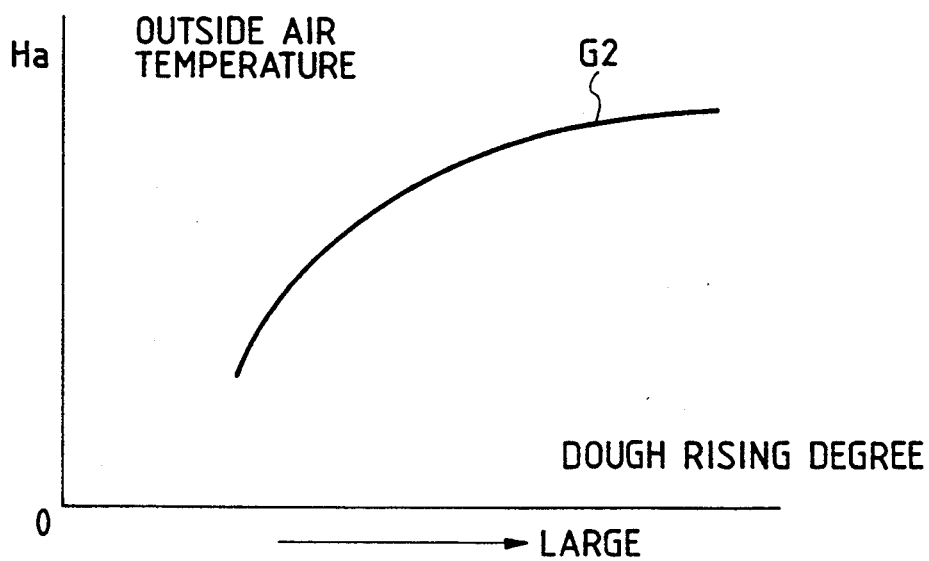

Further, a curve G2 in FIG. 3 (b) is a correlational curve indicating the relationship between the outside air humidity and the dough rising degree under a certain leavening condition (temperature and time). As is apparent from the curve, the dough rising degree is also largely dependent on the outside air humidity. The correlational data D include a plurality of correlational curves G2 under different leavening conditions (temperature and time).

The effects of the temperature and humidity of outside air upon the dough rising degree is exerted independently of each other. Therefore, an optimum leavening condition is found based on outside air temperature conditions and outside air humidity conditions.

A stirring motor 41 is disposed below the inner case 8. A pulley 42a mounted on the rotary shaft of the stirring motor 41 and a pulley 42b mounted on the rotary shaft of the stirring blade 14 are connected through a timing belt 43, so that the stirring blade 14 can be rotated upon rotation of the stirring motor 41. In addition, a blowing fan 46 is driven by a fan motor 45. Air flow produced by the blowing fan 46 is heated by a heater 47, and thereafter drawn up and blown out onto the top of the bread baking case 13 through a duct 48. The operations of the stirring motor 41, the fan motor 45, and the like are controlled by the microcomputer 18.

A mode of control in the first embodiment will be described with reference to the block diagram shown in FIG. 2.

The optimum leavening control program Pa stored in the memory device 21 within the microcomputer 18 receives outside air temperature data Ta from the outside air temperature detector 6 and outside humidity data Ha from the outside air humidity detector 7 during the dough leavening process. Then, this program sets an optimum leavening condition that implements a predetermined dough rising degree by accessing the memory device 20 to read the correlational data D, so that a relay of the heater 12 and relays 31, 32 of the motors 41, 45 are controlled by the set optimum leavening condition.

As a result of such configuration of the first embodiment, bread making capable of keeping a predetermined dough rising degree even if the outside air temperature and humidity are changed can be implemented.

A bread making machine, which is a second embodiment of the invention, will be described next with reference to FIGS. 4 and 5.

Figure 5:
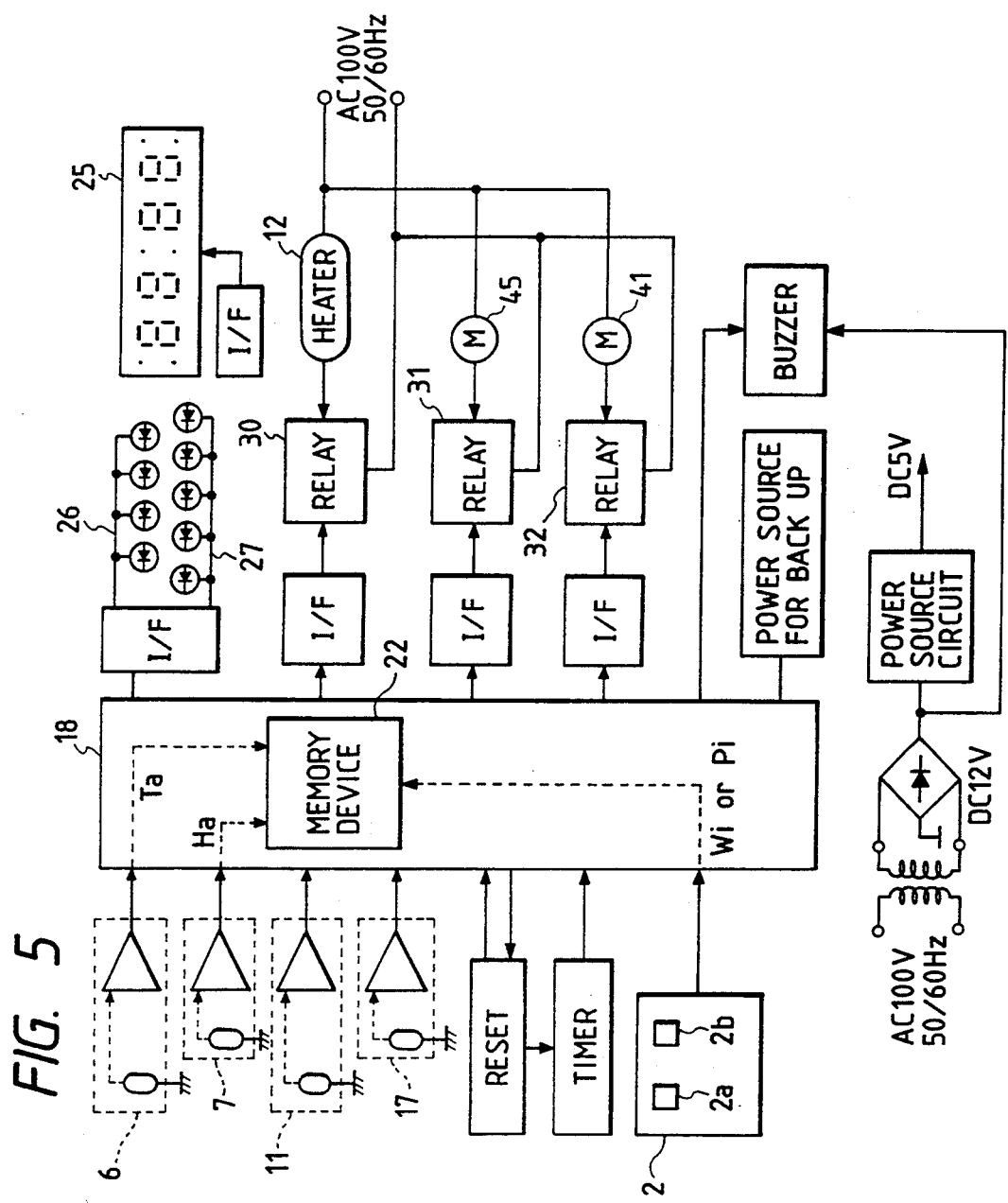
FIG. 5 is a block diagram showing the bread making machine of FIG. 4.

In FIGS. 4 and 5, a bread making machine B, which is the second embodiment of the invention, has a poured water amount input key 2a and a poured flour amount input key 2b on an operation panel 2, each key being operated by the user. Further, a microcomputer 18 on a circuit board 10 has a proper amount calculating program Pb for calculating a proper amount of water and a proper amount of flour. The program Pb is stored in a memory device 22. The second embodiment is characterized as setting a proper amount of flour or water corresponding to an input, which is either the poured water amount or the poured flour amount, based on such input and the outside air temperature and humidity, and displaying the set proper amount of flour or water on a display 25. Other configurational aspects are similar to those of the first embodiment, and the description thereof will therefore be omitted.

A mode of control in the second embodiment will be described with reference to the block diagram shown in FIG. 5.

The proper amount calculating program Pb stored in the memory device 22 within the microcomputer 18 receives outside air temperature data Ta from the outside air temperature detector 6 and outside humidity data Ha from the outside air humidity detector 7 during the dough leavening process. This program Pb also receives either poured water amount data Wi or poured flour amount data Pi from the poured water amount input key 2a or the poured flour amount input key 2b. Then, this program calculates a corresponding proper flour amount Ps or a corresponding proper water amount Ws, and displays the calculated amount on the display 25. The user can prepare the desired dough by pouring the amount of flour Ps or the amount of water Ws in accordance with the display.

As a result of the aforementioned configuration, bread making in which a predetermined dough rising degree can always be maintained constant with respect to the amount of water or flour poured can be implemented even if the outside air temperature and humidity are changed.

As is apparent from the foregoing, the bread making machine, which is the first embodiment of the invention, is characterized as causing the built-in optimum leavening control program Pa (the microcomputer 18) to control the dough leavening condition (at least one of the leavening time and the leavening temperature) based on the measured values from the outside air temperature detector 6 and the outside air humidity detector 7 and the built-in temperature-humidity correlational data D in function of the dough rising degree. Therefore, the making of breads whose sizes are always consistent can be implemented without being affected by the outside air conditions.

Further, the bread making machine, which is the second embodiment of the invention, is characterized as causing the proper amount calculating program Pb (the microcomputer 18) to calculate at least one of a proper amount of flour corresponding to the poured water amount and a proper amount of water corresponding to the poured flour amount inputted through the input keys 2a and 2b based on the measured values from the outside air temperature detector 6 and the outside air humidity detector 7, and displaying the calculated amount on the display 25. Therefore, the user can find the proper amount easily, which allows breads having consistent quality can be made without recourse to cumbersome calculations or uncertain sixth sense.

Figure 6:
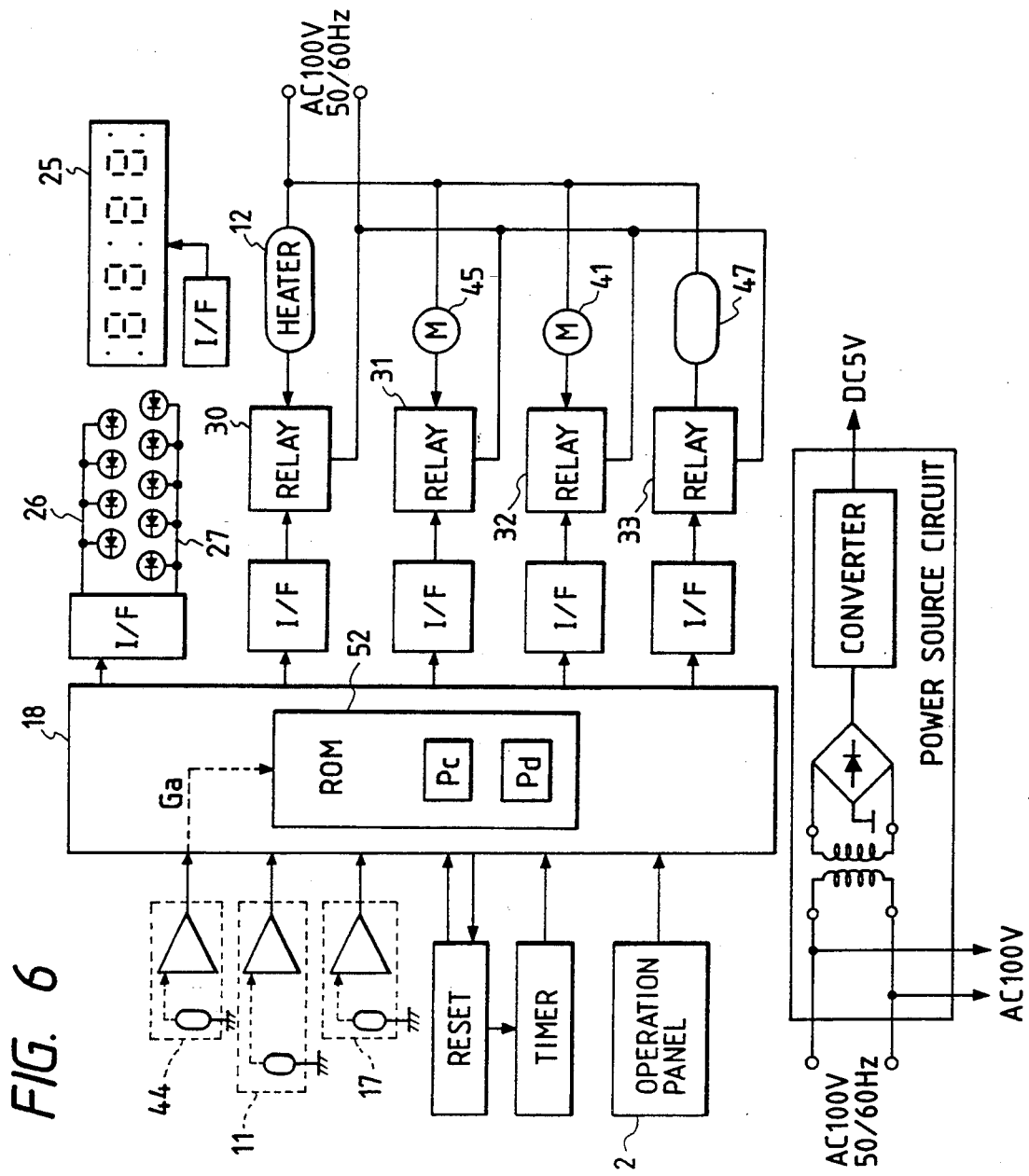
FIG. 6 is a block diagram showing a bread making machine, which is a third embodiment of the invention.
Figure 7:
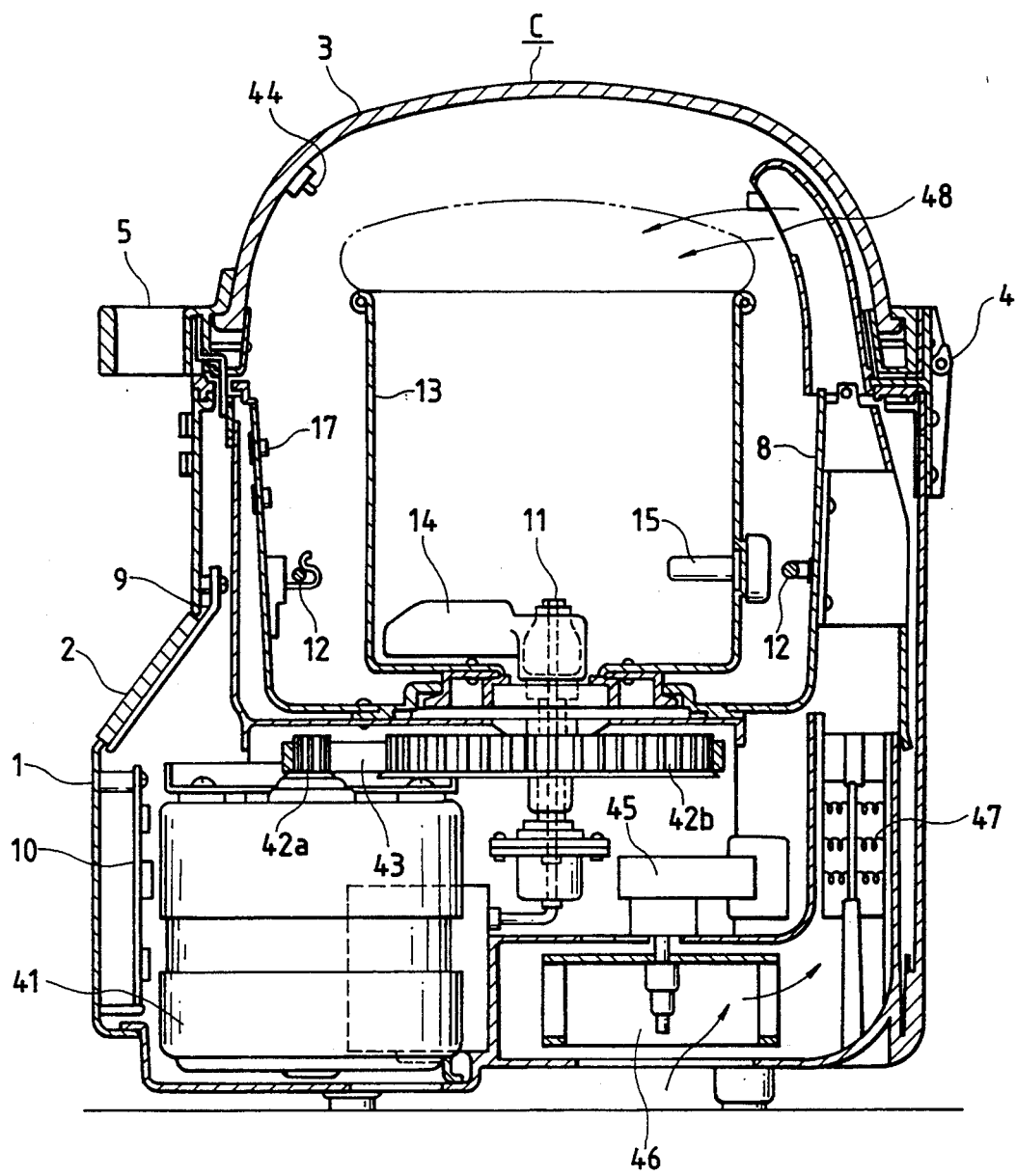
FIG. 7 is a sectional view of the bread making machine of FIG. 6.

FIG. 6 is a block diagram showing a bread making machine, which is a third embodiment of the invention; and FIG. 7 is a sectional view of the bread making machine of FIG. 6.

In FIG. 7, the bread making machine C, which is the third embodiment of the invention, has a cylindrical baking oven main body 1. An operation panel 2 having time setting and baking finish selection switches as well as input keys is provided in the middle of the front of the braking oven main body 1. A dome-like transparent glass lid 3 is arranged on top of the baking oven main body 1 so that the lid can be opened and closed. The baking oven main body 1 and the glass lid 3 constitute the closed container type bread making machine C.

The rear end of the glass lid 3 is pivotally attached to a bracket 4 arranged on the baking oven main body 1, whereas a handle 5 is disposed on the front end of the glass lid 3 so that the user can open and close the lid. In addition, a gas sensor 44 is disposed on the inner surface of the glass lid 3.

Inside the baking oven main body 1 are a cylindrical inner case 8, a display 25 corresponding to the operation panel 2, menu displaying LEDs 26, process displaying LEDs 27, and an operation board 9 having a key input drive section and the like attached thereto. A circuit board 10 supervising the control of the whole processes is also arranged (see FIG. 6).

A heat ray radiating heater 12, which is an electrothermic member, is annularly secured to the inner circumference of the inner case 8.

A bread baking case 13, which is cylindrical with the top thereof opened, is placed inside the inner case 8. A stirring blade 14 for mixing and kneading ingredients including water poured into the bread baking case 13 is rotatably arranged on the bottom of the case. In addition, a projecting member 15 is secured to the inner surface of the bread baking case 13 so as to prevent the dough that has been made plastic by stirring from being moved with the stirring blade 14.

The bread making machine, which is the third embodiment, is characterized as causing the gas sensor 44 disposed on the inner surface of the glass lid 3 to detect a volatile gas produced from the top of the bread baking case 13. It should be noted that the gas sensor 44 is preferably disposed above the bread baking case 13, although the place where it is positioned is not limited.

The gas sensor 44 serves to detect the density of a volatile gas, e.g., carbon dioxide, produced within the oven. When the flour leavens under the presence of the yeast, carbon dioxide is produced through decomposition of starch. Therefore, the monitoring of carbon dioxide density within the oven contributes to controlling the progress of the leavening process.

The density of carbon dioxide, which is a product of the leavening process, reflects the process condition faithfully. In other words, since the carbon dioxide density is a density that reflects a difference in ingredients used, the monitoring of the density allows control not affected by the difference in ingredients to be implemented. The volatile gas is produced not only in the finishing process but also in the baking process. An output Ga of the gas sensor 44 is applied to the microcomputer 18, and a fine adjustment program (which will be described later) gives, based on this data Ga, a fine adjustment to adjustment control involving the process time and temperature detected by the conventional temperature sensor and the like (see FIG. 6).

A dough sensor 11, which is a thermistor, is attached to the stirring blade 14 as a temperature detector. Further, an oven sensor 17 as a baking temperature detector is attached close to the bread baking base 13. These sensors serve to detect temperature for adjustment control in the respective processes during bread making.

The processes during bread making will be described with reference to the process diagram shown in FIG. 8. First, predetermined ingredients are poured into the bread baking case 13, and the glass lid 3 is then closed. Upon turning on a switch on the operation panel 2, the stirring blade 14 is driven to stir the ingredients. Then, a kneading process is started to prepare a dough. After the kneading process has been completed, the dough leavening process is started, which is then followed by the finishing process. The finishing process includes "rounding", "aging", "shaping", and "maturing" of the dough. After the finishing process comes the baking process. Process time and temperature controls are effected based on the temperatures detected by the dough sensor 11 and the oven sensor 17 in the leavening process, the "aging" of the finishing process, and the baking process, out of the aforementioned processes.

The circuit board 10 has a microcomputer 18 and the like. The microcomputer 18 controls the whole processes performed by the bread making machine C, and includes a memory device 52 (such as ROM) for storing a system control and process adjustment control program Pc and a fine adjustment program Pd.

A stirring motor 41 is disposed below the inner case 8. A pulley 42a mounted on the rotary shaft of the stirring motor 41 and a pulley 42b mounted on the rotary shaft of the stirring blade 14 are connected through a timing belt 43, so that the stirring blade 14 can be rotated upon rotation of the stirring motor 41. In addition, a blowing fan 46 is driven by a fan motor 45. Air flow produced by the blowing fan 46 is heated by a heater 47, and thereafter drawn up and blown out onto the top of the bread baking case 13 through a duct 48. The operations of the stirring motor 41 and the fan motor 45 are controlled by the microcomputer 18.

A mode of control in the third embodiment will be described with reference to FIG. 6.

First, as shown in FIG. 8, the process adjustment control program Pc within the microcomputer 18 starts the kneading process. In the succeeding leavening process, the process time and temperature are controlled based on the temperatures detected by the dough sensor 11 and the oven sensor 17. During this adjustment control operation, the fine adjustment program Pd within the microcomputer 18 causes the gas sensor 44 to apply the volatile gas (mainly, carbon dioxide) density Ga in the dough leavening process to the microcomputer 18. Control factors such as the time and temperature of the leavening process are calculated for correction based on this data. That is, the control factors are subjected to fine adjustment based on the volatile gas density Ga to define a more precise control operation. A relay 30 of the heater 12, a relay 33 of the heater 47, a relay 31 of the fan motor 45, and the like are driven based on such finely adjusted control operation.

For the "aging" step in the finishing process which comes next to the leavening process, control factors of the finishing process are similarly calculated for correction based on the volatile gas density Ga. That is, the control factors are subjected to fine adjustment based on the volatile gas density Ga to define a more precise finishing control operation. The relay 30 of the heater 12, the relay 33 of the heater 47, the relay 31 of the fan motor 45, and the like are driven based on such finely adjusted control operation.

In the baking process that succeeds the finishing process, control factors calculated by the adjustment control program Pc are similarly subjected to fine adjustment based on the volatile gas density Ga by the fine adjustment program Pd to define a more precise control operation. The relay 30 of the heater 12 and the like are driven based on such finely adjusted control operation.

As a result of the thus described configuration of the bread making method and bread making machine, breads whose qualities are close to a predetermined quality are always made even if the property, kind, and amount of ingredients poured is changed.

As is apparent from the foregoing, the bread making machine, which is the third embodiment, is characterized as causing the built-in fine adjustment control program Pd (the microcomputer 18) to finely adjust at least one adjustment control by the temperature sensors in at least one bread making process based on the measured value from the gas sensor 44 that detects a volatile gas produced in the oven. Therefore, breads having a consistent baking quality can always be made independently of differences in the property, amount, and the like of ingredients used.

It should be noted that the invention may also be embodied by way of a combination of the first and third embodiments, or a combination of the second and third embodiments.

What is claimed is:

1. A bread making machine having a baking oven main body, a bread baking case set in the baking oven main body, and a lid attached to an opening on top of the baking oven main body so as to be allowed to freely open and close, and preparing a dough by pouring water and ingredients into the bread baking case, mixing and kneading the poured ingredients, leavening the dough, and thereafter baking the leavened dough, said bread making machine comprising:
   temperature detection means for detecting an outside air temperature;
   humidity detection means for detecting an outside air humidity; and
   optimum leavening control means, which has correlational data on outside air temperatures and outside air humidities in function of dough rising degree, for setting a dough leavening condition corresponding to a predetermined bread rising degree based on the correlational data and values detected by said temperature detection means and said humidity detection means.

2. The bread making machine according to claim 1, wherein said optimum leavening control means includes a microcomputer and an optimum leavening control program for said microcomputer.

3. The bread making machine according to claim 1, wherein said lid is made of glass.

4. A bread making machine having a baking oven main body, a bread baking case set in the baking oven main body, and a lid attached to an opening on top of the baking oven main body so as to be allowed to freely open and close, and preparing a dough by pouring water and ingredients into the bread baking case, mixing and kneading the poured ingredients, leavening the dough, and thereafter baking the leavened dough, said bread making machine comprising:
   temperature detection means for detecting an outside air temperature;
   humidity detection means for detecting an outside air humidity;

input means for inputting an amount of water poured and an amount of flour poured;

proper amount calculating means for calculating at least one of a proper amount of flour to be poured corresponding to the amount of water poured and a proper amount of water to be poured corresponding to the amount of flour pored based on at least one of the amount of water poured and the amount of flour poured and the values detected by said temperature detection means and said humidity detection means; and display means for displaying the calculated proper amount.

5. The bread making machine according to claim 4, wherein said proper amount calculating means includes a microcomputer and a proper amount calculating program for said microcomputer.

6. The bread making machine according to claim 4, wherein said lid is made glass.

7. A bread making machine having a baking oven main body, a bread baking case set in the baking oven main body, an opening and closing lid attached to an opening on top of the baking oven main body, and at least one of an oven temperature detecting means and a dough temperature detecting means, and making bread by giving adjustment control to at least one of bread making processes based on a value detected by the detecting means, the bread making processes including a kneading process for preparing a dough by pouring water and ingredients into the bread baking case and mixing and kneading the poured ingredients, a leavening process for leavening the dough, a finishing process for adjusting the leavened dough, and a baking process for baking the leavened dough, said bread making machine comprising:

gas detection means for detecting a volatile gas produced within the baking oven main body; and fine adjustment means for finely adjusting control of at least one of the bread making processes based on a value detected by said gas detection means.

8. The bread making machine according to claim 7, wherein said gas detection means is disposed above the bread baking case.

9. The bread making machine according to claim 7, wherein said fine adjustment means includes a microcomputer and a fine adjustment control program for said microcomputer.

* * * * *